(12) United States Patent
Yoon et al.

(10) Patent No.: US 11,846,259 B2
(45) Date of Patent: Dec. 19, 2023

(54) PRESSURE REGULATOR AND FUEL PUMP MODULE HAVING THE SAME

(71) Applicant: COAVIS, Sejong-si (KR)

(72) Inventors: Chanheum Yoon, Sejong-si (KR); Kusung Kwon, Daejeon (KR); Changmo Kang, Sejong-si (KR)

(73) Assignee: COAVIS, Sejong-si (KR)

( * ) Notice: Subject to any disclaimer, the term of this patent is extended or adjusted under 35 U.S.C. 154(b) by 0 days.

(21) Appl. No.: 18/057,687

(22) Filed: Nov. 21, 2022

(65) Prior Publication Data
US 2023/0160361 A1   May 25, 2023

(30) Foreign Application Priority Data

Nov. 22, 2021   (KR) .......................... 10-2021-0161285

(51) Int. Cl.
*F02M 37/00*   (2006.01)
*F16K 17/04*   (2006.01)

(52) U.S. Cl.
CPC ..... *F02M 37/0029* (2013.01); *F16K 17/0446* (2013.01)

(58) Field of Classification Search
CPC .... F02M 37/10; F02M 37/103; F02M 37/106; F02M 37/0029
USPC ........................................ 123/446, 514, 509
See application file for complete search history.

(56) References Cited

U.S. PATENT DOCUMENTS

| | | | | |
|---|---|---|---|---|
| 1,807,594 A * | 6/1931 | Hopkins | ................. | F16K 1/385 251/86 |
| 2,909,192 A * | 10/1959 | Dobrick | ................ | F16K 15/063 137/543.13 |
| 2,960,998 A * | 11/1960 | Sinker | ................... | F16K 15/063 137/542 |
| 3,995,658 A * | 12/1976 | Hager | ................... | F16K 15/063 137/543 |
| 4,616,672 A * | 10/1986 | Schmidt | ............. | F16K 17/0433 137/107 |
| 4,633,901 A * | 1/1987 | Brandt | ................. | G05D 16/163 251/86 |
| 4,747,388 A * | 5/1988 | Tuckey | ................ | F02M 37/106 137/574 |

(Continued)

FOREIGN PATENT DOCUMENTS

| | | | | |
|---|---|---|---|---|
| JP | H1113265 A | 1/1999 | | |
| WO | WO-2014208804 A1 * | 12/2014 | ......... | F02M 37/0029 |
| WO | WO-2018061558 A1 * | 4/2018 | | |

*Primary Examiner* — Sizo B Vilakazi
*Assistant Examiner* — Brian R Kirby
(74) *Attorney, Agent, or Firm* — McCoy Russell LLP (57) ABSTRACT

Provided is a pressure regulator and a fuel pump module having the same, which may be easily assembled by including fewer components, the pressure regulator including: a first housing including a guide part positioned therein and guiding movement of a valve, and an outlet part communicating with an inner space thereof and discharging a fluid; a second housing coupled to the first housing, having a valve accommodating space, including a valve seating part, and including an inlet part introducing a fluid; a valve positioned in the valve accommodating space, and moved to thus open and close a fluid flow; and an elastic member interposed between the valve and the first housing to bring the valve into close contact with the valve seating part.

8 Claims, 9 Drawing Sheets

(56) References Cited

U.S. PATENT DOCUMENTS

| | | | | |
|---|---|---|---|---|
| 4,953,588 A * | 9/1990 | Sands | F16K 15/063 | 137/512.3 |
| 4,964,391 A * | 10/1990 | Hoover | F02M 69/46 | 137/542 |
| 5,078,167 A * | 1/1992 | Brandt | F02M 37/0058 | 137/115.27 |
| 5,195,494 A * | 3/1993 | Tuckey | F02M 37/44 | 123/514 |
| 5,361,742 A * | 11/1994 | Briggs | F02M 37/08 | 123/514 |
| 5,421,306 A * | 6/1995 | Talaski | F16K 27/0209 | 137/542 |
| 5,584,318 A * | 12/1996 | Brandt | F02M 37/50 | 210/433.1 |
| 5,605,133 A * | 2/1997 | Tuckey | F02M 69/54 | 123/511 |
| 5,613,476 A * | 3/1997 | Oi | F02M 37/10 | 123/514 |
| 5,642,718 A * | 7/1997 | Nakai | F02M 37/106 | 123/497 |
| 5,649,514 A * | 7/1997 | Okada | B01D 35/027 | 123/514 |
| 5,655,504 A * | 8/1997 | Iwai | F02M 37/0047 | 123/514 |
| 5,749,347 A * | 5/1998 | Torii | B60K 15/03519 | 137/202 |
| 5,762,047 A * | 6/1998 | Yoshioka | F02M 37/10 | 417/313 |
| 5,778,926 A * | 7/1998 | Tanaka | F02M 37/42 | 251/86 |
| 5,782,223 A * | 7/1998 | Yamashita | B01D 36/003 | 123/509 |
| 5,842,455 A * | 12/1998 | Tuckey | F02M 69/465 | 123/514 |
| 5,960,816 A * | 10/1999 | Mills | F16K 24/044 | 137/202 |
| 6,029,633 A * | 2/2000 | Brandt | F02M 37/10 | 123/509 |
| 6,135,523 A * | 10/2000 | Pratt | F16K 1/34 | 137/533.21 |
| 6,155,238 A * | 12/2000 | Briggs | F02M 37/50 | 123/457 |
| 6,161,574 A * | 12/2000 | Gerhard | F02M 69/54 | 123/514 |
| 6,231,318 B1 * | 5/2001 | Cotton | F02M 37/10 | 415/55.1 |
| 6,311,675 B2 * | 11/2001 | Crary | F02M 37/20 | 137/202 |
| 6,439,205 B2 * | 8/2002 | Ushigome | F02M 37/106 | 137/565.34 |
| 6,453,884 B2 * | 9/2002 | Ushigome | F02M 37/025 | 123/514 |
| 6,719,539 B1 * | 4/2004 | Yoshioka | F02M 37/44 | 417/363 |
| 6,953,026 B2 * | 10/2005 | Yu | F02M 63/0005 | 137/450 |
| 6,966,305 B2 * | 11/2005 | Aubree | F02M 37/103 | 123/497 |
| 7,210,460 B2 * | 5/2007 | Douyama | F02M 69/54 | 123/457 |
| 7,252,075 B2 * | 8/2007 | Firtion | B60K 15/077 | 123/514 |
| 7,278,401 B1 * | 10/2007 | Cotton | F02M 69/54 | 123/457 |
| 7,318,422 B2 * | 1/2008 | Douyama | F04B 17/03 | 123/495 |
| 8,360,740 B2 * | 1/2013 | Leppert | F02M 37/46 | 417/313 |
| 10,788,137 B2 * | 9/2020 | Higashi | B01D 35/1573 | |
| 11,493,011 B1 * | 11/2022 | Kamei | F02M 37/0041 | |
| 2003/0056769 A1 * | 3/2003 | McGrath | F02M 37/106 | 123/511 |
| 2004/0020839 A1 * | 2/2004 | Kato | B01D 35/027 | 210/232 |
| 2006/0207573 A1 * | 9/2006 | Douyama | F04D 13/06 | 123/509 |
| 2008/0184970 A1 * | 8/2008 | Igarashi | F02M 37/103 | 123/509 |
| 2013/0056098 A1 * | 3/2013 | Hanjagi | F16K 15/026 | 137/535 |
| 2015/0224873 A1 * | 8/2015 | Ishitoya | F02M 37/50 | 137/574 |
| 2018/0329435 A1 * | 11/2018 | Chalfin | F16K 3/14 | |
| 2021/0300175 A1 * | 9/2021 | Naito | F02M 37/103 | |

* cited by examiner

*Prior Art*

FIG. 1

*Prior Art*

PRESSURE REGULATOR AND FUEL PUMP MODULE HAVING THE SAME

CROSS REFERENCE TO RELATED APPLICATION

The present application claims priority to Korean Patent Application No. 10-2021-0161285 filed on Nov. 22, 2021. The entire contents of the above-listed application are hereby incorporated by reference for all purposes.

TECHNICAL FIELD

The following disclosure relates to a pressure regulator which may maintain a predetermined pressure in a fuel supply line through which a fuel discharged from a fuel pump is supplied to an engine, and a fuel pump module having the same.

BACKGROUND

In general, a device for a vehicle or the like, such as a gasoline engine or a diesel engine, that is driven by receiving a liquid fuel may be provided with a fuel tank for storing the fuel, the fuel tank may be installed with a fuel pump module, and the fuel pump module may be connected to the engine through a fuel supply line to supply the fuel stored in the fuel tank to the engine.

Figure 1:
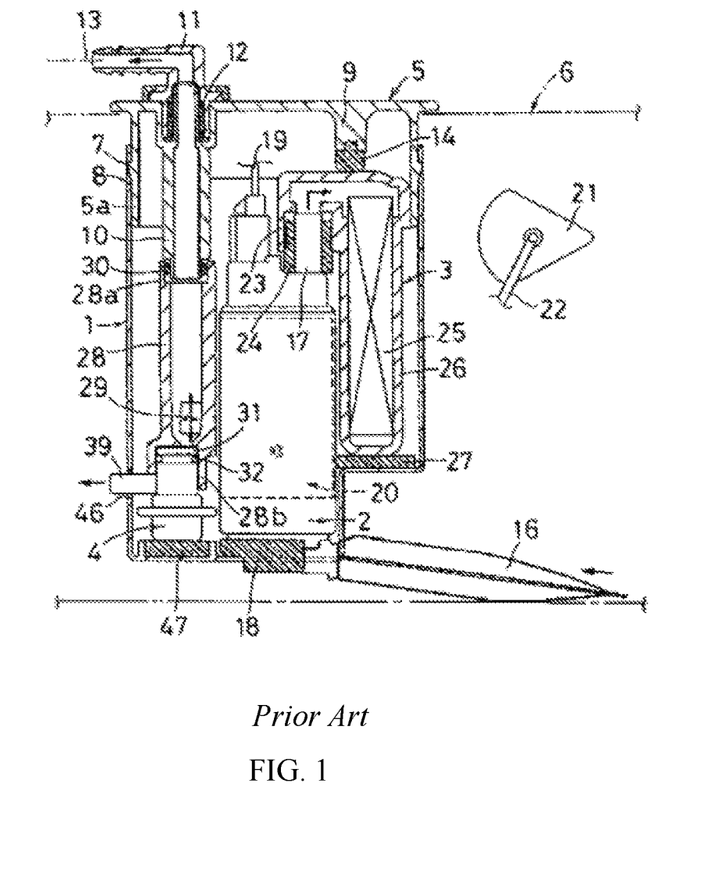
FIG. 1 is a cross-sectional view showing a pressure regulator and a fuel pump module according to the prior art.

Referring to FIG. 1, in a fuel pump module, a fuel outlet 17 of a fuel pump 2 may be connected to a fuel filter 3, the fuel filter 3 may be connected to a fuel supply line 13 through a communication pipe 28, and a fuel discharged from the fuel pump may be pumped to an engine through the fuel supply line. In addition, a pressure regulator 4 may be mounted on the communication pipe 28. Therefore, when a pressure inside the fuel supply line is increased to a certain pressure or more, the fuel may be partially discharged externally through the pressure regulator to thus maintain a predetermined pressure within the fuel supply line.

Recently used is control technology that supplies the engine with the fuel at only required flow rate and pressure by changing the number of revolutions (RPM) of a motor that drives the fuel pump, thus reducing a need for controlling the pressure of the supplied fuel through the pressure regulator.

Figure 2:
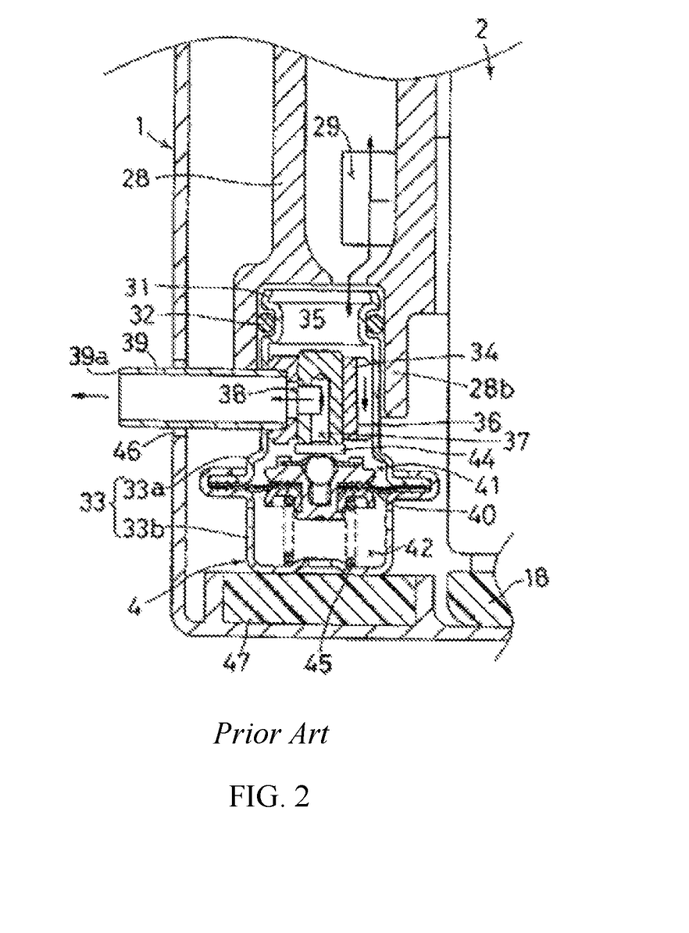
FIG. 2 is an enlarged view of the pressure regulator of FIG. 1.

However, the prior pressure regulator needs to be operated precisely, and thus have a complex structure using a large number of parts as shown in FIG. 2, which makes it difficult to manufacture the pressure regulator and increases its manufacturing cost.

RELATED ART DOCUMENT

Patent Document

JP 1998-047185 A (Feb. 17, 1998)

SUMMARY

Embodiments of the present disclosure are directed to providing a pressure regulator which may be easily manufactured by including significantly fewer components to thus reduce its manufacturing cost while playing the same role as a prior pressure regulator, and a fuel pump module having the same.

In one general aspect, a pressure regulator includes: a first housing including a guide part positioned therein and guiding movement of a valve, and an outlet part communicating with an inner space thereof and discharging a fluid; a second housing coupled to the first housing, and including a valve accommodating space formed therein by being coupled with the first housing, a valve seating part positioned therein and in contact with the valve, and an inlet part communicating with an inner space thereof and introducing a fluid; a valve positioned in the valve accommodating space, coupled to the valve accommodating space to be moved along the guide part of the first housing, and moved to be in contact with or spaced apart from the valve seating part of the second housing to thus open and close a fluid flow; and an elastic member interposed between the valve and the first housing to bring the valve into close contact with the valve seating part.

The first housing may have a shape of a concave container, and the guide part may protrude from an inner wall of the first housing, and the valve may be coupled to the guide part to be moved in a straight line.

The valve may include a rod and a head positioned at one end of the rod, the rod may be inserted into the guide part and the head is positioned adjacent to the valve seating part, and the elastic member may have one end supported by the head and the other end supported by the inner wall of the first housing.

A plate supporting the head may be positioned at one end of the rod, a coupling part may protrude from the plate, and the head may be inserted into and coupled to the coupling part.

A catching hole may be positioned in the first housing, a catching hook may be positioned in the second housing, and a protrusion of the catching hook may be inserted into and coupled to the catching hole.

A guide groove may be positioned in the first housing, a guide rib may protrude from the second housing, and the guide rib may be inserted into and coupled to the guide groove.

The pressure regulator may further include a filter mounted on the inlet part of the second housing to prevent a foreign material from being introduced to the inside through a fluid inlet of the inlet part.

In another general aspect, a fuel pump module having the pressure regulator of the present disclosure includes: a fuel pump suctioning a fuel and pumping the fuel to a fuel supply line; a pump mounting part mounted with the fuel pump and including a connection passage connecting the fuel pump and the fuel supply line with each other; and the pressure regulator coupled to the pump mounting part and having a fluid inlet connected to the connection passage of the pump mounting part.

The pressure regulator may include a flange protruding externally from the first housing, and the flange may be coupled and fixed to the pump mounting part.

A communication hole communicating with the connection passage may be positioned in the pump mounting part, and the inlet part of the pressure regulator may be inserted into the communication hole; and a fixing pin may be coupled to the pump mounting part, and the flange of the first housing may be supported by the fixing pin to prevent the pressure regulator from being separated from the pump mounting part.

Other features and aspects will be apparent from the following detailed description, the drawings, and the claims.

DETAILED DESCRIPTION OF EMBODIMENTS

Hereinafter, a pressure regulator and a fuel pump module having the same according to the present disclosure are described in detail with reference to the accompanying drawings.

Figure 3:
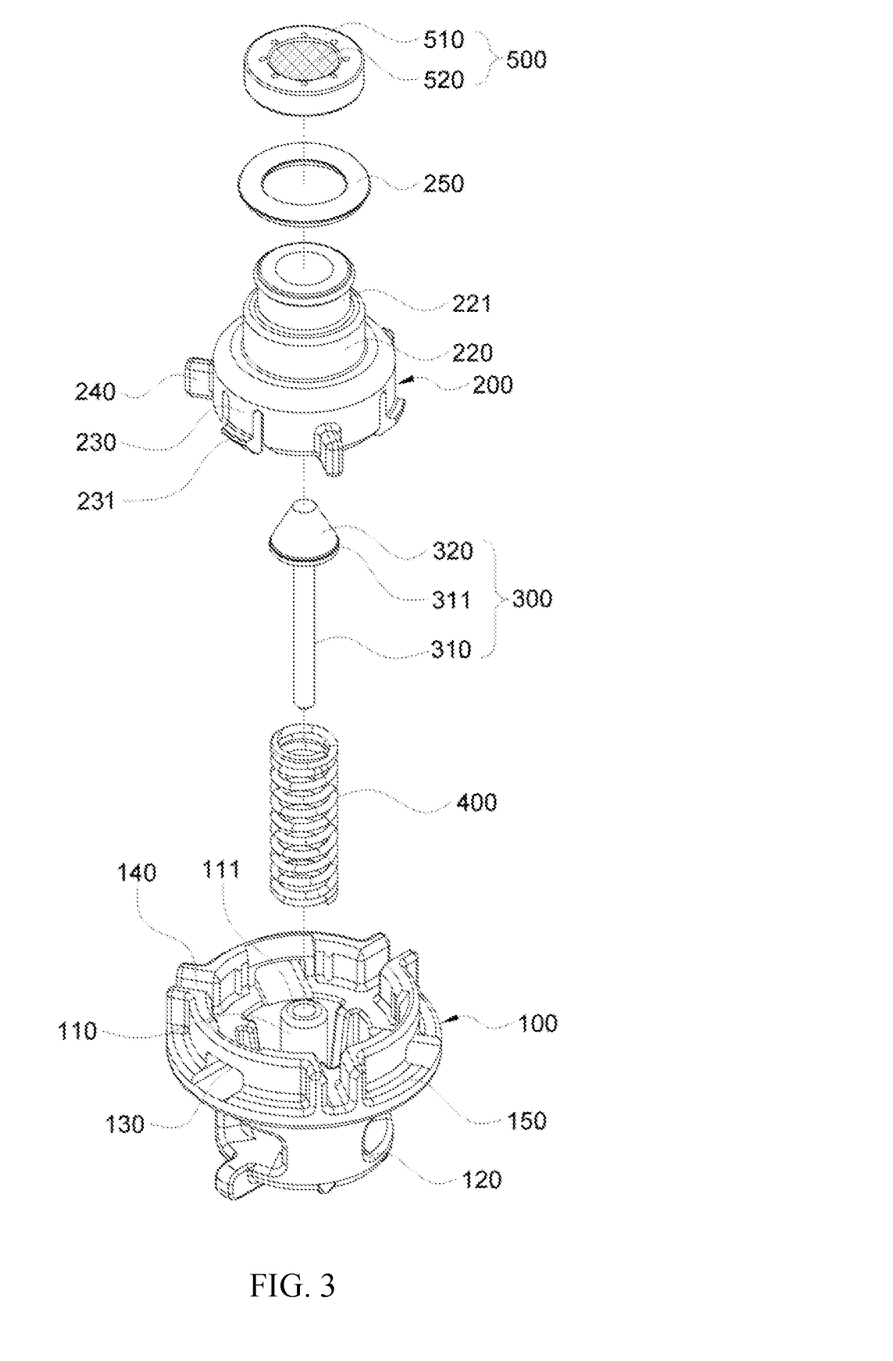
FIGS. 3 to 5 are an exploded perspective view, an assembled perspective view, and a front cross-sectional view showing a pressure regulator according to an embodiment of the present disclosure, respectively.
Figure 4:
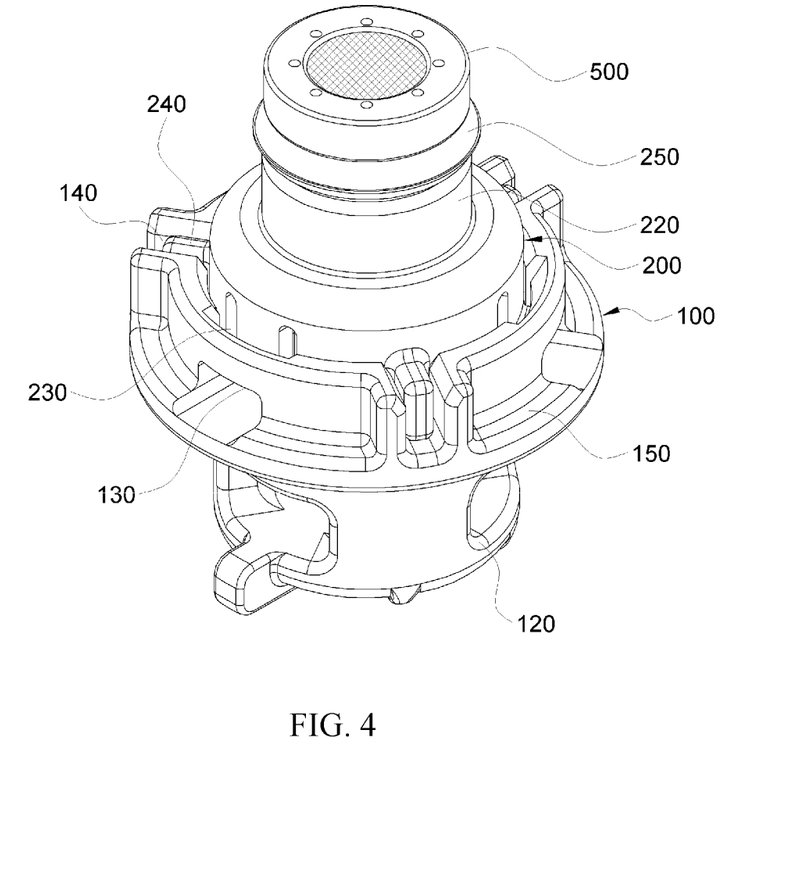
Figure 5:
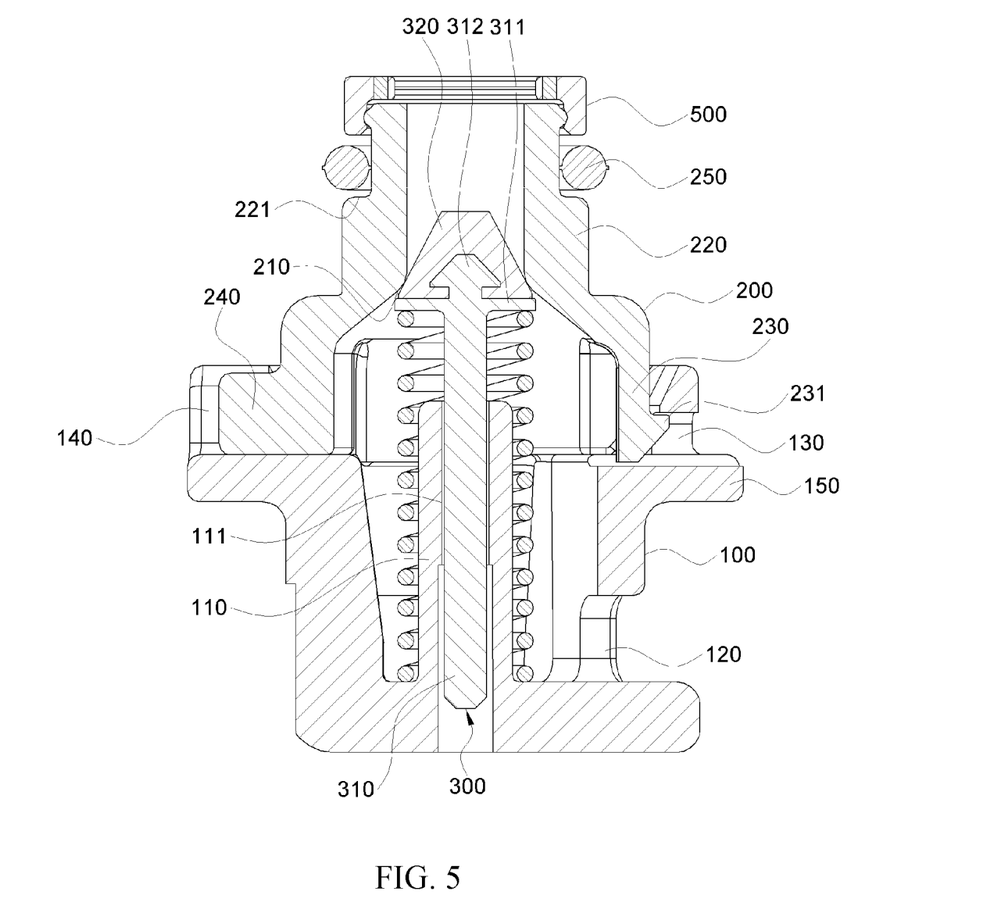

FIGS. 3 to 5 are an exploded perspective view, an assembled perspective view, and a front cross-sectional view showing the pressure regulator according to an embodiment of the present disclosure, respectively.

As shown in the drawings, the pressure regulator according to an embodiment of the present disclosure may roughly include a first housing 100, a second housing 200, a valve 300, and an elastic member 400.

The first housing 100 may have a shape of a container concave downward, and a plurality of outlet parts 120 may be positioned on a lower side of the first housing 100 and each have a shape of a hole passing through the inner and outer surfaces thereof. The first housing 100 may include guide part 110 positioned at the center and protruding upward from the bottom thereof, and the guide part 110 may have a through hole 111 positioned therein and passing through the guide part in a vertical direction. In addition, a plurality of catching holes 130 may be positioned in an upper side of the first housing 100, and for example, three catching holes 130 may be positioned while being spaced apart from one another at intervals of 120 degrees. In addition, a guide groove 140 may be positioned between the catching holes 130 in the upper side of the first housing 100 and concave downward from the upper side. In addition, the first housing 100 may have a flange 150 protruding outward from an outer side of a cylindrical sidewall. In addition, the first housing 100 may be made of a resin material through injection molding.

The second housing 200 may have a shape of a container concave upward, and an inlet part 220 extending on an upper side of the second housing 200, and having a shape of a cylinder extending in communicating with the inside. A concave stepped groove 221 may be positioned along a circumference of an outer surface of the inlet part 220, and an O-ring 250 may be inserted into the stepped groove 221. A valve seating part 210 may be positioned in a valve accommodating space in the second housing 200 so that the valve 300 is in contact therewith to thus open and close a fluid flow, the valve seating part 210 may be a part to which the inlet part 220 is connected in the valve accommodating space. For example, the valve seating part 210 may have a cross-sectional area gradually reduced as being closer to the inlet part 220 from the valve accommodating space. In addition, a catching hook 230 may be positioned on the lower side of the second housing 200 and correspond to the catching hole 130, and a protrusion 231 may protrude outward from a lower end of the catching hook 230. Therefore, a lower end of the second housing 200 may be inserted into and coupled to an upper end of the first housing 100, and here, the protrusion 231 of the catching hook 230 may be inserted into and coupled to the catching hole 130. In addition, a guide rib 240 may protrude outward from the lower end of the second housing 200 and correspond to the guide groove 140. Therefore, the guide rib 240 may be guided by, inserted into, and coupled to the guide groove 140 while the catching hook 230 of the second housing 200 is aligned with the catching hole 130 of the first housing 100. In addition, the second housing 200 may be made of the resin material through the injection molding.

The valve 300 may be positioned in the valve accommodating space formed by the coupling of the first housing 100 and the second housing 200, and the valve 300 may be coupled to the valve accommodating space to be moved along the guide part 110 of the first housing 100. The valve 300 may include a rod 310 having a shape of a rod having a length greater than its diameter and a head 320 coupled to one end of the rod 310. In addition, a disk-shaped plate 311 may be positioned at one end of the rod 310, a coupling part 312 having an arrow-shaped cross section may be positioned on the plate 311, and the head 320 may be coupled to the coupling part 312. The head 320 may have a shape of a cone with one end cut off. In addition, one side of the head 320 that has a relatively small diameter may be smaller than the diameter of the valve seat part 210, and the other side of the head 320 that has a relatively large diameter may be larger than the diameter of the valve seat part 210. Therefore, the head 320 may be hooked by the valve seating part 210 of the second housing 200 to be in contact therewith or spaced apart therefrom as the valve 300 is moved to open or close the fluid flow.

The elastic member 400 may be, for example, a compression coil spring, and the elastic member 400 may be fitted to and coupled to an outer side of the guide part 110 of the first housing 100. In addition, the elastic member 400 may have one end supported by the plate 311 of the valve 300 and the other end supported by the inner bottom surface of the first housing 100. Therefore, the head 320 of the valve 300 may be brought into close contact with the valve seating part 210 by the elastic member 400, thus maintaining the closed valve as shown in FIG. 5 in a state where no external force acts thereon.

In addition, the pressure regulator according to an embodiment of the present disclosure may further include a filter 500. For example, the filter 500 may include a cap 510 coupled to an upper end of the inlet part 220 of the second housing 200 and a filtering net 520 coupled to the cap 510. The cap 510 may have holes passing through both upper and lower surfaces thereof, and a concave groove may be positioned in the lower end, and caught by a ring-shaped projection protruding outward from the upper end of the inlet part 220 of the second housing 200, to be coupled with each other so that the groove is not separated from the protrusion. The filtering net 520 may have any of various shapes. For example, the filtering net 520 may have a mesh shape and be coupled to the cap 510 or integrally formed with the cap 510. Therefore, a foreign material may be filtered out of the fluid flowing through the filter 500, and the foreign material may thus be prevented from being introduced to the inside of the pressure regulator through the inlet part 220.

Figure 6:
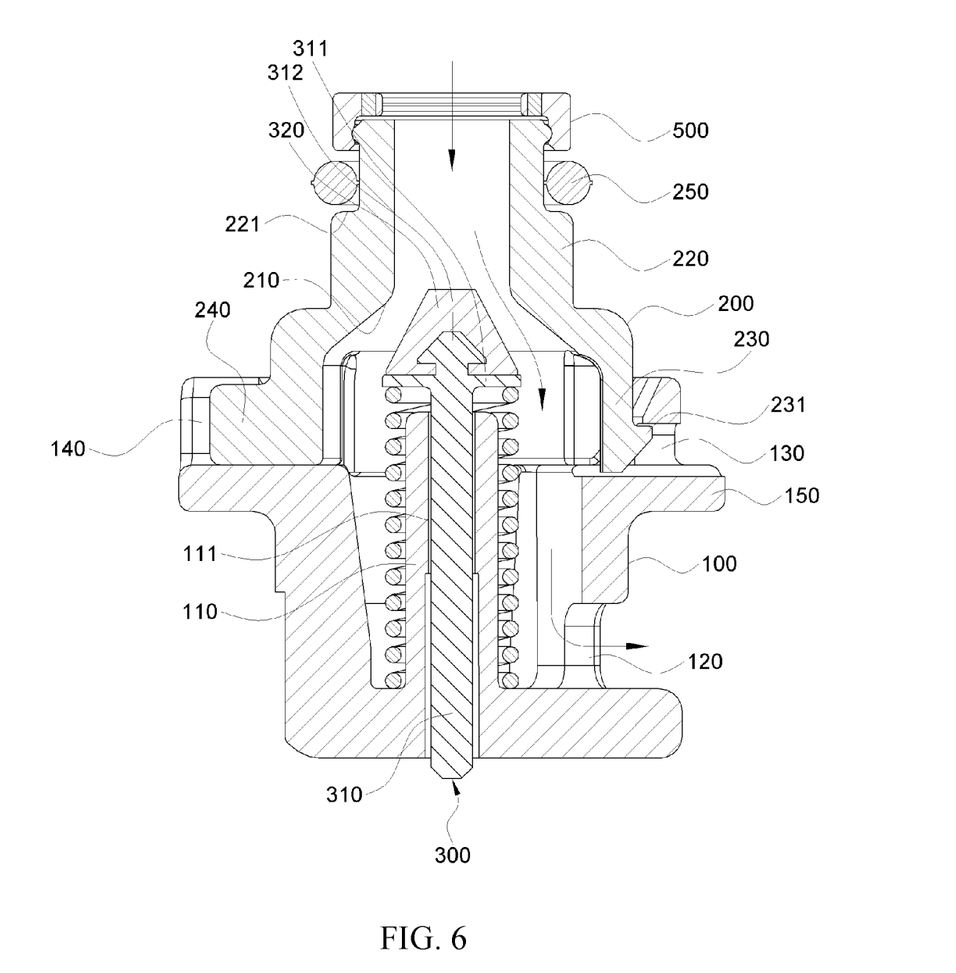
FIG. 6 is a front cross-sectional view showing a state where a valve is opened by a fluid pressure in the pressure regulator according to an embodiment of the present disclosure.

FIG. 6 is a front cross-sectional view showing a state where the valve is opened by a fluid pressure in the pressure regulator according to an embodiment of the present disclosure.

Referring to FIG. 6, when the pressure of the fluid introduced through the inlet part 220 is increased as much as or more than the elastic force of the elastic member 400, the valve 300 may be pushed out to separate the head 320 from the valve seating part 210, and the fluid may thus flow through a gap therebetween to be externally discharged through the outlet part 120 of the first housing 100. Therefore, the fluid pressure acting on the inlet part 220 may be maintained as a predetermined pressure without being increased to a certain pressure or more.

Accordingly, the pressure regulator of the present disclosure may be easily assembled by including fewer components to thus reduce its manufacturing cost. In addition, the valve may be smoothly operated without shaking or vibrating even when there is a change in the fluid flow or the pressure when the valve is moved to be opened or closed by using the coupling structure in which the valve may be moved along the guide part.

Figure 7:
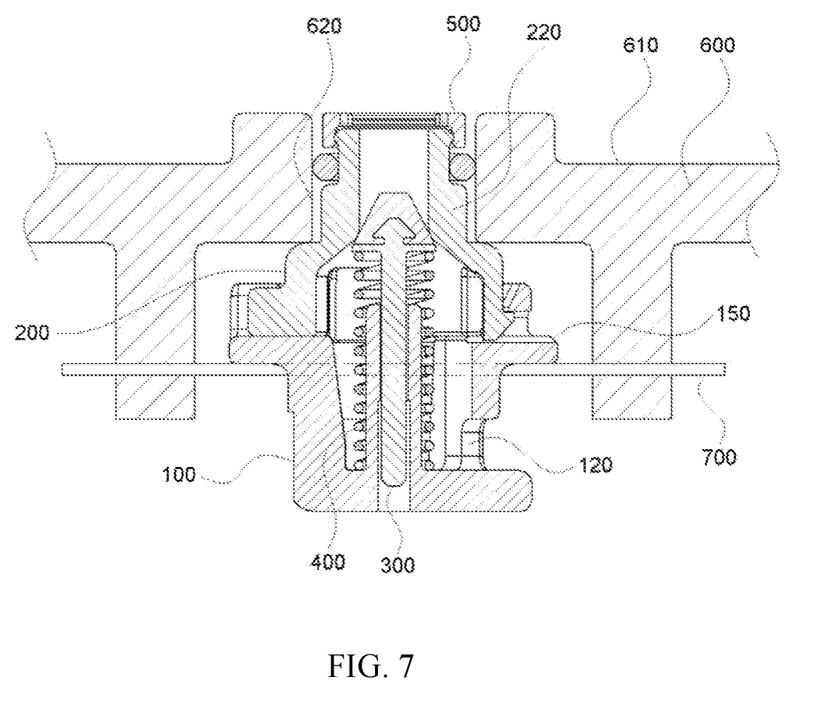
FIGS. 7 and 8 are cross-sectional and side views each showing a portion of a fuel pump module mounted with a pressure regulator according to another embodiment of the present disclosure.
Figure 8:
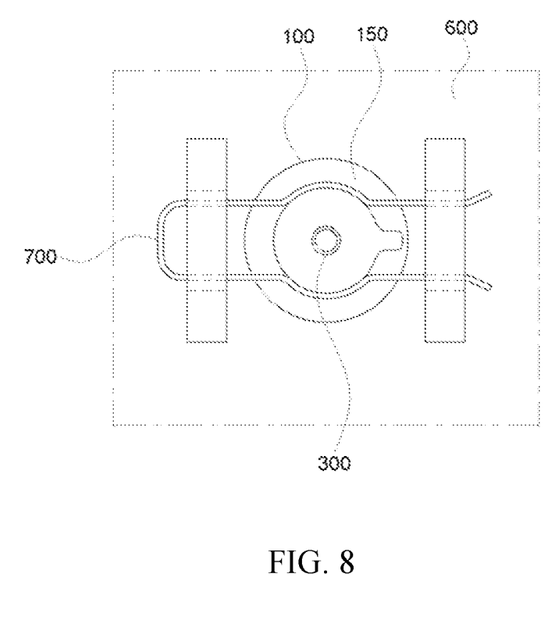

FIGS. 7 and 8 are cross-sectional and side views each showing a portion of the fuel pump module mounted with a pressure regulator according to another embodiment of the present disclosure.

As shown in the drawings, the fuel pump module including a pressure regulator according to another embodiment of the present disclosure may roughly include a fuel pump (not shown), a pump mounting part 600, and the pressure regulator.

The fuel pump is a device that suctions a fuel and pumps the fuel to a fuel supply line, and may be a fuel pump of any of various types and shapes that are generally used.

The pump mounting part 600 may be mounted with the fuel pump, and include a connection passage 610 connecting the fuel pump and the fuel supply line with each other. In addition, a communication hole 620 communicating with the connection passage 610 may be positioned in the pump mounting part 600.

The inlet part 220 of the pressure regulator may be inserted into the communication hole 620 of the pump mounting part 600, and the inlet of the pressure regulator may communicate with the connection passage 610. In addition, the pressure regulator may include the flange 150 protruding outward from the outer surface of the cylindrical sidewall of the first housing 100, and caught and supported by a fixing pin 700, and both sides of the fixing pin 700 may be coupled to the pump mounting part 600 so that the pressure regulator is coupled to the pump mounting part 600 not to be separated therefrom.

Therefore, when the pressure regulator is coupled to the pump mounting part of the fuel pump module, all parts of the pressure regulator may be supported by the fixing pin and fixed not to be separated therefrom, thus preventing some parts of the pressure regulator from being separated by the fluid pressure.

Figure 9:
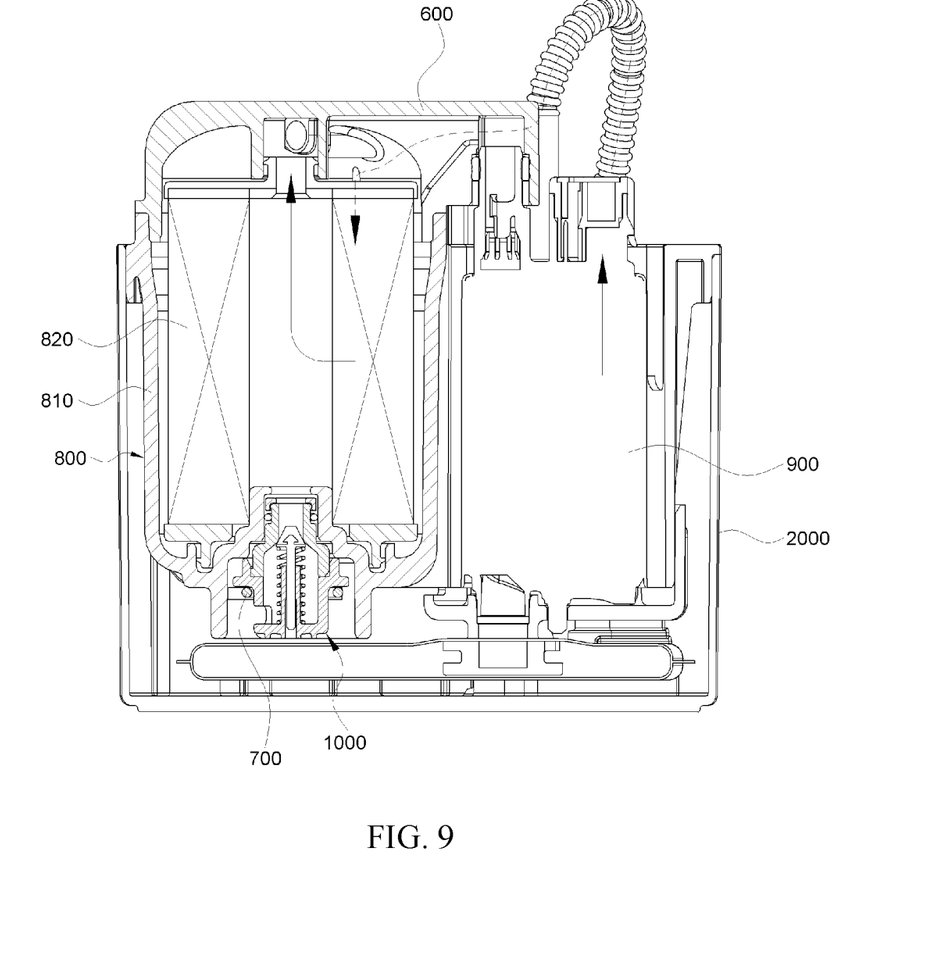
FIG. 9 is a cross-sectional view showing the fuel pump module in a state where the pressure regulator is mounted in a filter housing of an in-tank filter according to another embodiment of the present disclosure.

FIG. 9 is a cross-sectional view showing the fuel pump module in a state where the pressure regulator is mounted in a filter housing of an in-tank filter according to another embodiment of the present disclosure.

As shown in the drawing, the fuel pump module of the present disclosure may further include an in-tank filter 800. A fuel pump 900 and the in-tank filter 800 may be coupled to the pump mounting part 600, and the pump mounting part 600 may be coupled to a reservoir body 2000 so that the fuel pump 900 and the in-tank filter 800 may be accommodated in the reservoir body 2000. In addition, the in-tank filter 800 may include a filter housing 810 and a filter media 820. The filter housing 810 may be coupled to the pump mounting part 600, and the filter media 820 may be positioned in the filter housing 810. Here, a pressure regulator 1000 may be coupled to the filter housing 810 of the in-tank filter 800 by using the fixing pin 700, and the pressure regulator 1000 may be connected to the inside of the in-tank filter 800.

Therefore, the fuel discharged from the fuel pump 900 may pass through the in-tank filter 800, and then be pumped to the engine through the fuel supply line. Here, the pressure regulator 1000 may be connected with the in-tank filter 800. Therefore, when the pressure of the fuel in the in-tank filter 800 is increased to the certain pressure or more, the fuel may be discharged externally from the in-tank filter 800 through the pressure regulator 1000 to thus be stored in the reservoir body 2000.

As set forth above, the pressure regulator and a fuel pump module having the same according to the present disclosure may be easily assembled by including the fewer components to thus reduce its manufacturing cost.

In addition, the pressure regulator and a fuel pump module having the same according to the present disclosure may prevent some parts of the pressure regulator from being separated by the fluid pressure when the pressure regulator is coupled to the fuel pump module.

The present disclosure is not limited to the above-described embodiments, and may be variously applied. In addition, the present disclosure may be variously modified by those skilled in the art to which the present disclosure pertains without departing from the gist of the present disclosure claimed in the claims.

The invention claimed is:

1. A pressure regulator comprising:
   a first housing including a guide part positioned therein and guiding movement of a valve, and an outlet part communicating with an inner space thereof and discharging a fluid;
   a second housing coupled to the first housing, and including a valve accommodating space formed therein by being coupled with the first housing, a valve seating part positioned therein and in contact with the valve, and an inlet part communicating with an inner space thereof and introducing a fluid;
   a valve positioned in the valve accommodating space, coupled to the valve accommodating space to be moved along the guide part of the first housing, and moved to be in contact with or spaced apart from the valve seating part of the second housing to thus open and close a fluid flow; and
   an elastic member interposed between the valve and the first housing to bring the valve into close contact with the valve seating part,
   wherein the first housing has a shape of a concave container, and the guide part protrudes from an inner wall of the first housing, and
   the valve is coupled to the guide part to be moved in a straight line,
   wherein the valve includes a rod and a head positioned at one end of the rod,
   the rod is inserted into the guide part and the head is positioned adjacent to the valve seating part, the elastic member has one end supported by the head and the other end supported by the inner wall of the first housing, there is no diaphragm connecting the head of the valve and the first housing or the second housing, the valve has no through passage through which a fluid is discharged, and when the valve is opened by the pressure of a fluid,
- the fluid introducing through the inlet part passes between the head and the valve seating part,
- flows through a gap between an outer side of the guide part and the inner wall of the first housing, and
- is externally discharged through the outlet part of the first housing.

2. The pressure regulator of claim 1, wherein a plate supporting the head is positioned at one end of the rod, a coupling part protrudes from the plate, and the head is inserted into and coupled to the coupling part.

3. The pressure regulator of claim 1, wherein a catching hole is positioned in the first housing, a catching hook is positioned in the second housing, and a protrusion of the catching hook is inserted into and coupled to the catching hole.

4. The pressure regulator of claim 3, wherein a guide groove is positioned in the first housing, a guide rib protrudes from the second housing, and the guide rib is inserted into and coupled to the guide groove.

5. The pressure regulator of claim 1, further comprising a filter mounted on the inlet part of the second housing to prevent a foreign material from being introduced to the inside through a fluid inlet of the inlet part.

6. A fuel pump module comprising:
- a fuel pump suctioning a fuel and pumping the fuel to a fuel supply line;
- a pump mounting part mounted with the fuel pump and including a connection passage connecting the fuel pump and the fuel supply line with each other; and
- the pressure regulator of claim 1 coupled to the pump mounting part and having a fluid inlet connected to the connection passage of the pump mounting part.

7. The fuel pump module of claim 6, wherein the pressure regulator includes a flange protruding externally from the first housing, and the flange is coupled and fixed to the pump mounting part.

8. The fuel pump module of claim 7, wherein a communication hole communicating with the connection passage is positioned in the pump mounting part, and the inlet part of the pressure regulator is inserted into the communication hole, and a fixing pin is coupled to the pump mounting part, and the flange of the first housing is supported by the fixing pin to prevent the pressure regulator from being separated from the pump mounting part.

* * * * *